United States Patent
Broussely

[11] Patent Number: 6,060,186
[45] Date of Patent: May 9, 2000

[54] BATTERY WITH INSULATED CASING PROTECTED AGAINST CORROSION

[75] Inventor: Michel Broussely, Liguge, France

[73] Assignee: Alcatel, Paris, France

[21] Appl. No.: 09/045,850

[22] Filed: Mar. 23, 1998

[30] Foreign Application Priority Data

Mar. 24, 1997 [FR] France ................................. 97 03543

[51] Int. Cl.[7] .................................................. H01M 2/00
[52] U.S. Cl. .................................. 429/7; 429/8; 429/163; 429/224; 429/231.95; 429/231.2; 429/231.5
[58] Field of Search ...................... 429/7, 8, 48, 231.95, 429/231.2, 231.5, 224, 59, 60, 163

[56] References Cited

U.S. PATENT DOCUMENTS

| | | | |
|---|---|---|---|
| 3,945,847 | 3/1976 | Kordesch et al. | 429/206 |
| 4,246,326 | 1/1981 | Sprengel et al. | 429/59 |
| 4,621,034 | 11/1986 | Kanda et al. | 429/59 |
| 5,162,169 | 11/1992 | Tomantschger et al. | 429/59 |
| 5,260,146 | 11/1993 | Savovic et al. | 429/65 |
| 5,328,780 | 7/1994 | Desai . | |
| 5,601,951 | 2/1997 | Johnson et al. | 429/346 |

FOREIGN PATENT DOCUMENTS

WO9513629   5/1995   WIPO .

*Primary Examiner*—Maria Nuzzolillo
*Assistant Examiner*—J. O'Malley
*Attorney, Agent, or Firm*—Sughrue, Mion, Zinn, Macpeak & Seas, PLLC

[57] ABSTRACT

An electrical battery comprises in a metallic casing filled with electrolyte at least one electrode pair comprising a separator, a positive electrode, a separator and a negative electrode, the electrodes of the same polarity being connected in parallel and to positive and negative output terminals insulated from the casing. It includes an additional electrode in contact with the bottom of the casing and impregnated with electrolyte containing an electrochemically active material chosen so that its electrochemical potential is in the range of passivating and stabilizing the metal of the casing. In one embodiment the casing is made of aluminum and the additional electrode is made from a material selected from a metallic oxide or sulfide, containing lithium or not, the potential of which relative to lithium is in the range 2 V to 3.5 V, for example $V_2O_5$, $Li_xV_2O_5$, $MnO_2$, $Li_xMnO_2$, $MoS_2$, $Li_xMoS_2$.

11 Claims, 2 Drawing Sheets

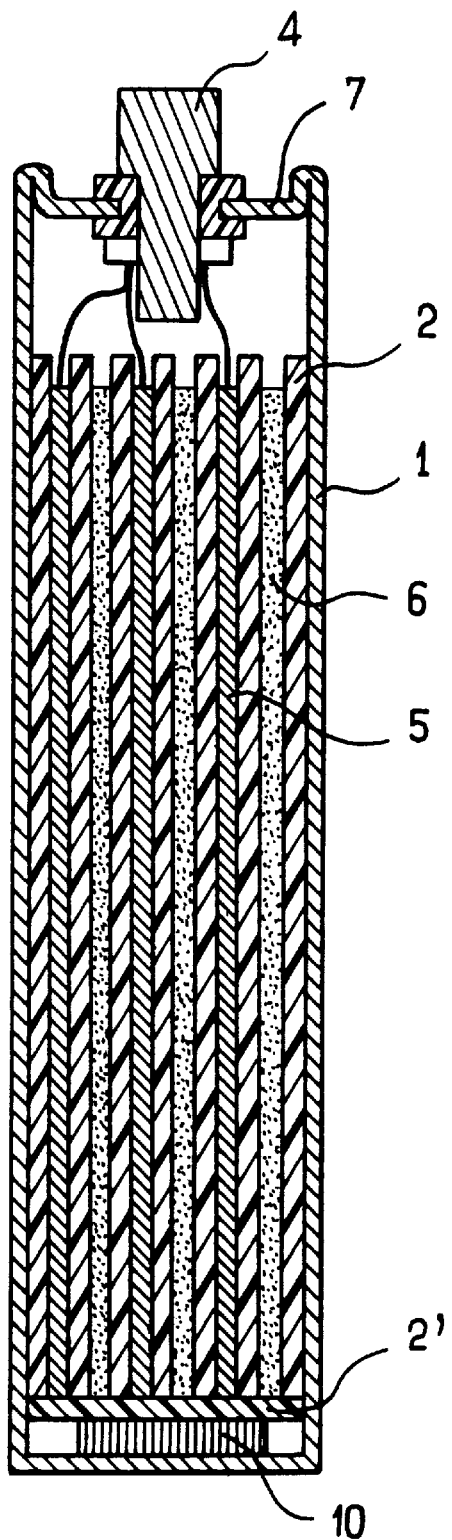
FIG_2

BATTERY WITH INSULATED CASING PROTECTED AGAINST CORROSION

BACKGROUND OF THE INVENTION

1. Field of the Invention

The present invention concerns a battery containing in a metallic casing at least one electrode pair comprising a separator, a positive electrode, a separator and a negative electrode, the assembly being impregnated with electrolyte, the electrodes of the same kind being connected in parallel and to respective output terminals.

2. Description of the Prior Art

When it is metallic, the casing of a battery is very often used for one of the poles.

In this case, the skilled person knows that the metal of said casing must be chemically and electrochemically stable relative to the electrolytic solution at the potential imposed on it by the electrode of the battery to which it is connected.

For example, it must not be oxidized when it is at the high potential of the positive electrode.

In the case of batteries with high energy density and a non-aqueous electrolyte the positive electrode materials can be very strongly oxidizing. For example, lithium manganese oxide in the form of spinel $LiMn_2O_4$ must be at a potential of at least 4.3 V relative to a lithium electrode to be charged sufficiently. Cobalt oxide and nickel lithium oxide must be at a potential of 4.2 V or 4.1 V, respectively, to be charged.

Under such conditions nickel, nickel-plated steel or stainless steel at such potentials in a non-aqueous electrolyte consisting of solvents such as alkyle carbonates and a lithium salt such as $LiPF_6$, $LiBF_4$, $LiClO_4$, $LiCF_3SO_3$ or any other type of lithium salt is oxidized electrochemically.

Ni, Fe, Cu ions pass into solution and have a very negative effect on the stability and the self-discharge of the battery. The casing ultimately perforates because the corrosion is mainly in the form of pin-holes. It is consequently necessary to select stable metals. The only one known at present is aluminum which is also used for the current collectors of the electrodes in this type of battery.

The casing can be connected to the negative electrode. In this case it is also necessary to assure that no unwanted electrochemical reaction occurs at the surface of the metal at the reducing potential in an electrolytic solution. In the case of batteries with a lithium anode or an anode material, such as carbon, with inserted lithium, this potential is very strongly reducing relative to the solvent. The latter reacts and this forms a layer having ionic conduction properties at the interface with the metal.

Depending on the nature of the metal, this layer can be passivating, that is say self-inhibiting vis-à-vis the reaction, to a greater or lesser degree. If the passivation is insufficient the reaction of reduction of the electrolyte by the negative active material (Li or substance with inserted lithium) continues, leading to self-discharge of the element. This phenomenon is accentuated if the temperature is raised.

To avoid these constraints, when the configuration of the battery allows, two output terminals insulated from the casing can be used; the casing is then at a "floating" potential that is not determined by the potential of an active electrode. This configuration can be of benefit if it is required to avoid a large conductive surface at the battery potential, as for example in the series connection of high-capacity batteries.

However, this solution also has a drawback: not being fixed by an active electrode, the potential can take any value within the range of electro-activity of the electrolyte. The latter can be very high in the case of non-aqueous electrolyte batteries (up to 4 volts or 5 volts).

Consequently, even very small quantities of impurities in the electrolyte can cause an undesirable potential at the metal/electrolyte interface at which depassivation reactions can occur in the case of a stainless steel, nickel or aluminum casing, for example, or a casing of any other metal that is stabilized by a passivating oxide layer. This depassivation can then be accompanied by corrosion, in particular pinholes.

Very strongly reducing materials can act at the surface of the metal to degrade it. This occurs with accidental deposits of lithium through the growth of dendrites from the negative electrode. If the casing is of aluminum an alloy with formula LiAl is formed, degrading the mechanical properties of the aluminum and possibly culminating in perforation of the casing.

Casings made from material proof against such attack have been proposed to solve these problems, like the special steel disclosed in Japanese patent application N° 241113 of 1993 or in document FR-A-2 260 876. Such materials are costly and their high weight reduces the energy per unit mass.

The aim of the invention is to propose a battery with a metallic casing the positive and negative terminals of which are insulated from the casing and in which there is no risk of corrosion and none of the aforementioned drawbacks.

SUMMARY OF THE INVENTION

The invention consists in introducing an additional electrode in electrical contact with the interior of the casing, impregnated with electrolyte and containing an electrochemically active material chosen so that its electrochemical potential relative to the electrolyte is in the range passivating and stabilizing the metal of the casing. The interface potential of the latter with the electrolyte is therefore fixed in a range in which no harmful reaction can occur.

The additional electrode is advantageously in the form of an aluminum support partly covered with active material and ultrasonically welded to the exposed surface of a free part of the casing.

The electrolyte is preferably a non-aqueous solvent electrolyte.

In the case of a conventional prism-shaped battery, the additional electrode is advantageously disposed on the end wall of the casing and separated by an appropriate separator from the electrode pair. Likewise in a cylindrical battery, the electrode pair being wound in a spiral.

Given the materials used for the casing and the electrodes, the skilled person knows the potential window within which the material of the additional electrode must be situated to counter the risk of corrosion. Thus in the case of an aluminum casing, a lithium alloy can form at a potential less than approximately 0.5 V relative to lithium in the electrolyte solution of a lithium-carbon anode battery and the casing can be corroded in some electrolytes if its potential is greater than 4.3 V. A material with a potential between these values is particularly suitable for the additional electrode, for example an $LiV_2O_5$ electrode (potential approximately 2.5 volts).

More generally, the material for the additional electrode can advantageously be a metallic oxide or sulfide, containing lithium or not, the potential of which relative to lithium is in the range 2 V to 3.5 V, for example $V_2O_5$, $Li_xV_2O_5$, $MnO_2$, $Li_xMnO_2$, $MoS_2$, $Li_xMoS_2$.

The positive electrode advantageously contains at least one lithium-containing oxide of a transition metal and the negative electrode is advantageously chosen from graphites and disordered carbon that can be graphitized or not, and mixtures thereof.

The potential of the additional electrode can be checked periodically and adjusted by simple recharging with the cathode by temporarily connecting a resistance between the casing and the positive pole.

Other features and advantages of the invention will emerge from the following description of three non-limiting embodiments given with reference to the appended drawing.

BRIEF DESCRIPTION OF THE DRAWING

FIG. 2 is a view of the battery from FIG. 1 in vertical section.

DETAILED DESCRIPTION OF THE PREFERRED EMBODIMENT

EXAMPLE 1

Figure 1:
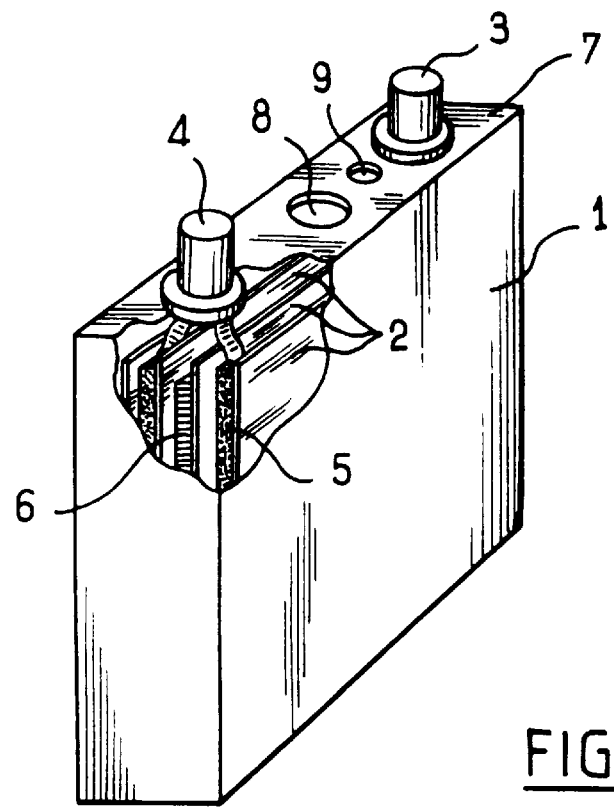
FIG. 1 is a partly cut away perspective view of a prism-shape battery to which the invention applies.
Figure 3:
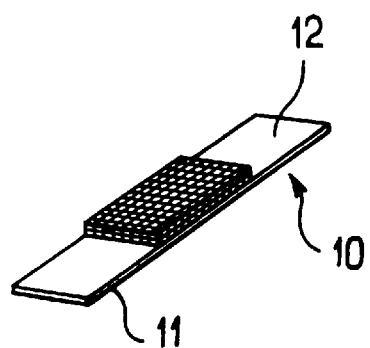
FIG. 3 is a perspective view of the additional electrode in accordance with the invention.

A small battery was made in a prism-shaped casing 1 (see FIG. 1) having the following dimensions: 15 mm×50 mm×100 mm.

The active materials of the electrodes 5, 6 were lithium nickel oxide ($LiNiO_2$) in the case of the positive electrode and lithium in the case of the negative electrode.

The positive electrodes 6 were made by applying a mixture of 90% $LiNiO_2$ and 6% polyvinylidene fluoride as binder dissolved in N methyl pyrrolidone, 2% carbon black and 2% graphite as conductive agents successively to the two faces of an aluminum tape. 1.85 g of this mixture (dry weight) was used to make an electrode 6 with a thickness of 0.20 mm and dimensions of 45 mm×80 mm.

The negative electrodes 5 consisted in a film of lithium 0.20 mm thick provided with nickel connections for connecting the electrodes to each other and to the negative terminal 4.

A stack comprising a separator 2, a positive electrode 6, a separator 2 and a negative electrode 5 constituted an electrode pair. The separator 2 was a microporous polypropylene film. A stack of 28 of such pairs constituted the active part of the battery shown in FIG. 1.

The electrodes 5, 6 of the same kind were connected in parallel and to the respective output terminal 4, 3. The terminals 4, 3 were insulated from the casing 1 by an insulative polypropylene member also providing the seal.

The prism-shaped casing 1 was made of aluminum. The device of the invention comprised a small electrode 10 connected to the bottom wall of the casing 1 and covered with a separator 2'.

The electrode 10 was made in the following manner:

a mixture of vanadium oxide $V_2O_5$ (86%), polyvinylidene fluoride (10%), graphite (2%) and acetylene black (2%) was deposited on one face of an aluminum tape 11. 70 mg of the mixture made an electrode 10 with dimensions of 35 mm×10 mm with a part 12 of its surface not covered with active material. This part was used for ultrasonic welding of the electrode 10 to the bottom wall of the aluminum casing 1 before introduction of the electrode assembly 5, 6.

After introduction of the electrode assembly 5, 6 the casing 1 was closed by its lid 7, including the output terminals 3, 4, a safety device consisting of a safety valve 8 and an electrode filler hole 9. The electrolyte consisted of a molar solution of $LiPF_6$ in a mixture of solvents comprising dimethyl carbonate, propylene carbonate and ethylene carbonate in respective amounts by volume of 60%, 20%, 20%.

The resulting battery was charged at a current of 0.5 A to a voltage of 4.1 V during which the positive material underwent the following transformation:

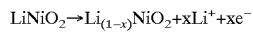

$$LiNiO_2 \rightarrow Li_{(1-x)}NiO_2 + xLi^+ + xe^-$$

The negative electrode was enriched with lithium as follows:

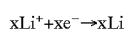

$$xLi^+ + xe^- \rightarrow xLi$$

The quantity of electricity employed relative to the mass of positive active material introduced was used to calculate the composition of the material in the charged state.

In this case the result obtained was: $Li_{0.35}NiO_2$. After resting for one hour, the potential differences of each electrode relative to the other were measured with zero current. The following values were noted:

TABLE 1

| | |
|---|---|
| +/− | 4.060 V |
| +/CASING | 0.610 V |
| CASING/− | 3.450 V |

Note that the potential of the casing relative to the lithium electrode (taken as 0 V by way of a reference) was 3.45 V. In this area the stability of aluminum is very good and there is no risk of corrosion. The potential was that determined by the vanadium oxide $V_2O_5$ electrode.

The battery was then stored for two weeks at 45° C. after which the electrode potential was measured again (table 2).

TABLE 2

| | |
|---|---|
| +/− | 4.030 V |
| +/CASING | 0.580 V |
| CASING/− | 3.450 V |

Note that the electromotive force of the battery had decreased slightly (−30 mV). Note however that the potential of the casing relative to the lithium had not varied, so still assuring good stability vis-à-vis corrosion.

The reduction in the electromotive force of the battery (±) was therefore due to a reduction of the positive electrode potential, it turn due to extremely partial reduction of the active material by the electrolyte.

The potential of the $Li_{(1-x)}NiO_2$ electrode depended on its state of charge. It varied quasi-continuously from around 4.06 V in the charged state ($Li_{0.35}NiO_2$) to around 3.60 V in the discharged state ($Li_{0.85}NiO_2$).

EXAMPLE 2

The positive electrode was the same as in example 1.

The negative electrode was made by a method identical to that used for the positive electrode. A mixture consisting of 90% graphite and 10% polyvinylidene fluoride binder was applied to both faces of a copper tape. 1.15 g of the mixture made an electrode with dimensions of 48 mm×82 mm and a thickness of 0.23 mm.

A stack comprising a separator, a positive electrode, a separator and a negative electrode constituted an electrode pair. The separator was a film of microporous polypropylene. A stack of 26 of these pairs constituted the active part of the battery.

The prism-shaped casing was made of aluminum, the auxiliary electrode of vanadium oxide. The device of the invention was identical to that described in the previous example, and was installed in the battery in the same way.

The battery was finished and then filled with the same electrolyte as in example 1.

The resulting battery was charged for the first time at a constant current of 0.5 A until the potential difference between the two terminals was equal to 4.0 V.

During this charging, the materials underwent a reversible transformation as follows (for one mole of LiNiO$_2$ associated with y moles of carbon):

positive: $LiNiO_2 \rightarrow Li_{(1-x)}NiO_2 + xLi^+ + xe^-$ negative: $yC + xLi^+ + xe^- \rightarrow C_yLi_x$ When the battery was completely charged to 4.0 V it was possible to calculate x from the quantity of electricity used and the respective masses of each active material.

In this example, for the positive material a value x=0.65 was obtained, i.e. $Li_{0.35}NiO_2$. The quantity of lithium inserted per atom of carbon in the negative electrode varied with the quantity of graphite used and depended on consumption of the lithium to form a passivating layer on the carbon, which depended on the carbon used. It was not greater than one atom of lithium per six atoms of carbon, i.e. $LiC_6$.

After a rest period of one hour the potential differences between the electrodes were measured. The results obtained are set out in table 3:

TABLE 3

| | |
|---|---|
| +/− | 3.96 V |
| +/casing | 0.61 V |
| casing/− | 3.35 V |

Note therefore that the potential of the casing was between that of the positive electrode and that of the negative electrode.

Note that the potential difference between the casing and the positive electrode was the same as in example 1, a value at which the casing was protected against oxidation.

On the other hand, the potential relative to the negative material was down 0.1 V, by comparison with example 1, and likewise the potential difference between the two terminals. This indicated, in accordance with the theory, that the potential of the lithium graphite electrode $LiC_6$ relative to a lithium electrode was 0.1 V.

The battery was then stored for two weeks at 45° C. after which the potentials were measured again.

TABLE 4

| | |
|---|---|
| +/− | 3.93 V |
| +/casing | 0.58 V |
| casing/− | 3.35 V |

As in example 1, a reduction was noted due to slight reduction of the positive active material. The potential of the casing relative to the negative polarity had not altered, which indicated that the potential of the casing had not changed, as in example 1, and likewise that of the negative electrode, the potential of which did not vary with the state of charge in a small range.

EXAMPLE 3

A battery in all respects identical to that of example 2 was made, except for the nature of the substance of the protection electrode connected to the casing. The latter was manganese dioxide MnO$_2$ obtained by heating EMD MnO$_2$ (electrolytic manganese dioxide) for five hours at 350° C. to obtain the standard material used in lithium batteries, replacing vanadium oxide V$_2$O$_5$. The electrode contained 70 mg of a mixture of 80% MnO$_2$, 8% binder, 5% carbon black and 5% graphite to constitute an electrode 35 mm×10 mm and 0.17 mm thick. The battery was made and charged under the same conditions as those described for example 2. After a rest of one hour the potential differences of the electrodes were measured. They are set out in table 5.

TABLE 5

| | |
|---|---|
| +/− | 3.96 V |
| +/casing | 0.71 V |
| casing/− | 3.25 V |

Note that the potential difference between the terminals was identical to that of example 2, which was normal since the electrodes were identical. On the other hand the potential of the casing, fixed by the electrode of the invention, was in this case slightly less (0.1 V) than that at the negative electrode. Knowing that the potential of the negative electrode is 0.1 V relative to the lithium, it was possible to deduce that the potential of the casing relative to lithium was 3.35 V, with no risk of corrosion of the casing.

After storage for two weeks at 45° C. the measured values had changed in shown in table 6:

TABLE 6

| | |
|---|---|
| +/− | 3.93 V |
| +/casing | 0.73 V |
| casing/− | 3.20 V |

Note that the potential of the casing relative to the negative electrode had fallen approximately 0.05 volts which indicated that the potential of the electrode of the invention had dropped by this amount, to a value of 3.3 V relative to the lithium. This in no way impeded the required effect, since the risk of corrosion increases only with an increase of potential. This is because the zero current potential of a manganese dioxide electrode depends on its state of discharge at the beginning of the discharge, as shown by the curves for discharging prior art Li/MnO$_2$ batteries. Like $Li_{0.35}NiO_2$, this material was slightly reduced by the electrolyte during storage.

The above examples are not limiting on the invention. For example, other materials such as LiCoO$_2$ or LiMn$_2$O$_4$ can be used for a positive electrode, or other types of carbon, such as coke or non-graphitable carbon for the negative electrode, without departing from the scope of the invention.

What is claimed:

1. An electrical storage battery comprising:
   a metallic casing containing an electrolyte;
   an electrode pair installed in said casing, and having a separator, a positive electrode, a separator, and a negative electrode, said electrode pair electrically insulated from said casing; and
   an additional electrode (1) in electrical contact with said casing, (2) electrically insulated from said electrode pair, and (3) containing an electrochemically active material chosen so that said additional electrode has an electrochemical potential relative to said electrolyte in a range passivating and stabilizing said metal of said casing.

2. The battery claimed in claim 1 wherein said casing is made of aluminum.

3. The battery claimed in claim 1, wherein said additional electrode comprises an aluminum support partly covered with said electrochemically active material and ultrasonically welded to a surface of a free part of said casing.

4. The battery claimed in claim 1 wherein said electrolyte is a non-aqueous solvent electrolyte.

5. The battery claimed in claim 4, wherein said additional electrode is made from a material selected from the group consisting of a metallic oxide and a sulfide, the potential of which relative to lithium is in the range 2.0 V to 3.5 V.

6. The battery claimed in claim 4, wherein said positive electrode contains at least one lithium-containing oxide of a transition metal and said negative electrode is fabricated from a material chosen from the group consisting of graphites, disordered carbons, and mixtures thereof.

7. The battery claimed in claim 1 wherein said additional electrode is disposed on the bottom wall of said casing and separated from said electrode pair by a separator.

8. A battery as claimed in claim 1 which is prism-shaped.

9. A battery as claimed in claim 1 which is cylindrical and includes an electrode pair consisting of a positive electrode, a negative electrode and two separators wound in a spiral.

10. The battery claimed in claim 1, wherein a plurality of said electrode pairs are installed in said casing, all of said positive electrodes connected in parallel and connected to a positive terminal, and all of said negative electrodes connected in parallel and connected to a negative terminal.

11. The battery claimed in claim 5, wherein said additional electrode is made from a material selected from the group consisting of $V_2O_5$, $Li_xV_2O_5$, $MnO_2$, $Li_xMnO_2$, $MoS_2$, and $Li_xMoS_2$.

* * * * *